US006831761B2

(12) United States Patent
Cardot et al.

(10) Patent No.: US 6,831,761 B2
(45) Date of Patent: Dec. 14, 2004

(54) DOCUMENT SCANNER HAVING A SELECTABLE RANGE OF RESOLUTIONS WITH REDUCED PROCESSING

(75) Inventors: Timothy R. Cardot, Henrietta, NY (US); Bruce A. Link, Rochester, NY (US); Lawrence J. Bernstein, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 541 days.

(21) Appl. No.: 09/822,050

(22) Filed: Mar. 30, 2001

(65) Prior Publication Data

US 2002/0140998 A1 Oct. 3, 2002

(51) Int. Cl.[7] .............................. H04N 1/46; H04N 1/04; H01L 27/00
(52) U.S. Cl. ...................... 358/505; 358/482; 358/483; 358/513; 358/514; 358/475; 250/208.1
(58) Field of Search ................................ 358/482, 483, 358/513, 514, 505; 250/208.1

(56) References Cited

U.S. PATENT DOCUMENTS

| | | | |
|---|---|---|---|
| 5,773,814 A | * | 6/1998 | Phillips et al. ............ 250/208.1 |
| 5,921,539 A | | 7/1999 | Westcott et al. |
| 2002/0093697 A1 | * | 7/2002 | Spears et al. ............... 358/514 |
| 2003/0093694 A1 | * | 5/2003 | Medvinsky et al. ........ 713/201 |

* cited by examiner

Primary Examiner—Edward Coles
Assistant Examiner—Houshang Safaipour
(74) Attorney, Agent, or Firm—Nixon Peabody LLP

(57) ABSTRACT

A document scanner for producing any combination of color or grayscale or bi-tonal document images having a selectable range of resolutions is provided that maximizes image production speed by minimizing the processing required to produce the particular type of images selected. The scanner includes an imaging camera including a high-resolution grayscale CCD sensor in combination with lower resolution red, green, and blue CCD sensors. The scanner further includes an image processing circuit for processing data generated by the grayscale and color CCD sensors into any combination of color, grayscale, or bi-tonal document images having high or low resolution. High-resolution color images are produced by superimposing the high-resolution grayscale image generated by the grayscale sensor with the lower resolution color images generated by the color CCD sensors. The image processing circuit may also produce high or low resolution, color, grayscale or bi-tonal images when selected at respectively lower bandwidths. In all cases, image production speed is maximized by using only a minimum amount of processing required to generate the particular type and resolution of document image.

19 Claims, 4 Drawing Sheets

DOCUMENT SCANNER HAVING A SELECTABLE RANGE OF RESOLUTIONS WITH REDUCED PROCESSING

FIELD OF THE INVENTION

This invention generally concerns document scanners, and is specifically directed toward a scanner for producing document images having a selectable range of image types and resolutions at reduced processing bandwidths.

BACKGROUND OF THE INVENTION

Optical scanners for scanning and recording optical data present on documents are well known in the art. Such optical scanners typically include a scanning station having an electronic imaging camera, a light source, and a platen formed from glass or transparent plastic for maintaining a document in a flat position during relative movement between the line-of-sight of the imaging camera and the document. For scanners limited to producing grayscale or bi-tonal images, the camera typically includes only a single linear image sensor, such as a charge-coupled device (CCD) having a resolution of anywhere between 100 to 400 pixels per inch (at the document), depending upon the desired resolution of the final image. Cameras for scanners capable of producing color images include three linear CCD imaging sensors for generating red, green, and blue image data, respectively. In operation, the documents are fed across the line-of-sight of the imaging camera, while the CCD imaging element or elements generate image data, which is temporarily stored in a buffer memory after analog to digital conversion. The stored bits of image data are then transmitted to an image processing circuit where the data is calibrated, corrected so that the resulting output mimics the physiological response of the human eye, and appropriately rotated, cropped, and scaled prior to being arranged in a form which will generate the desired image in a printer or on a video monitor.

While such prior art document scanners work well for their intended purpose, the inventors have observed several shortcomings which limit their productivity. For example, the operational speed of conventional color document scanners is limited by the high data rate associated with processing the image data generated by the trilinear CCD imaging elements in combination with the high power lighting required to illuminate the documents to the level necessary for the CCD imaging sensors to rapidly sense and transmit the color data. Of course, more powerful processors and higher intensity lighting could be used to increase the data processing rate and hence the production speed of the device. However, such a solution would substantially increase the overall cost of the scanner, as well as its power requirements. Scanners designed to operate exclusively in grayscale or bi-tonally require substantially less bandwidth for operation. They also do not require the intensity of illumination that a trilinear, color filtered CCD imaging sensor requires. Consequently, such scanners are capable of producing images of the same resolution as those produced by color scanners in a fraction of the time and with substantially less power. However, the resulting images cannot provide any information with respect to color. In certain applications, the lack of such a color capacity severely limits the usefulness of the scanner. Finally, while the documents being scanned in a single scanning run often have differing image requirements (i.e., many may be scanned in grayscale or bi-tonally at either high or low resolution, while others require color scanning) there presently exists no scanner capable of providing the desired range and choice of image types and resolutions in a manner which makes efficient use of bandwidth. For example, even though it is possible to generate grayscale images from a color scanner, the processing circuit of such color scanners still requires a higher degree of bandwidth than if a grayscale scanner were used. Thus production speed is not maximized. Also, it is difficult to generate accurate bi-tonal images from a color-filtered, trilinear CCD imaging array.

Clearly, what is needed is a document scanner, which is capable of providing color image information at production speeds substantially higher than those associated with conventional color document scanners without the need for expensive, high capacity processors or higher-powered lighting. Ideally, such a scanner should be capable of providing images of either high or low resolution which may be color, grayscale, or bi-tonal in order to meet the specific needs of a broad array of end users. Finally, it would be desirable if the image processor of such a scanner used only the amount of bandwidth necessary to produce the particular type of document image selected by the end user so that production speed at all selections is maximized.

SUMMARY OF THE INVENTION

Generally speaking, the invention is a document scanner that overcomes the limitations associated with the prior art by providing either color, grayscale or bi-tonal images having a selectable range of resolutions with a minimum amount of bandwidth. To this end, the document scanner comprises an imaging camera including a grayscale electronic imaging element for generating high-resolution grayscale images, and a plurality of color imaging elements for generating low-resolution color images. The scanner further comprises an image processing circuit for efficiently processing the data generated by the imaging elements into a selected one of color, grayscale, or bi-tonal document images in either high resolution or low resolution.

The grayscale imaging element is preferably a linear CCD image sensor of high resolution having between about 300 to 600 pixels per inch relative to the document. Each of the color imaging elements is also preferably a linear CCD having a lower resolution capacity of between about 100 to 300 pixels per inch. Preferably, all four of the linear CCD image sensors are arranged mutually parallel, wherein the center portion of the pixels of the grayscale sensor are aligned with a side edge of the pixels of each of the color sensors in order to minimize the generation of unwanted artifacts in the final image.

A driver circuit is connected to each of the CCD image sensors for conveying image data from the sensors to buffer amplifiers. Analog to digital circuits are provided for digitizing the image data from the buffer amplifiers and for conveying the digitized data into an image processor.

Depending upon the particular type of document image selected by the end user, the processor circuit proceeds to generate either a color, grayscale, or bi-tonal image that is either high or low resolution. If high resolution color is selected, the processor generates a composite of a high-resolution grayscale image in combination with the color images generated by the lower resolution color sensors. Because the human eye is more sensitive to the high-resolution grayscale image in the resulting composite color image, the resulting composite image provides a color image of high subjective quality with far less processing than would be required by a conventional color scanner camera utilizing three high-resolution CCD image sensors. Moreover, when color image information is not required or desired in the end product, the image processor is capable of providing either high or low resolution grayscale images or bi-tonal images with the fraction of the processing required for color images. Additionally, the processor can generate any combination of color, grayscale, and bi-tonal images. In all cases, production speed is maximized by the selectability of the specific type of document image needed by the end user and the optimum use of processing resources to execute the particular type of document images requested.

DETAILED DESCRIPTION OF THE INVENTION

Figure 1:
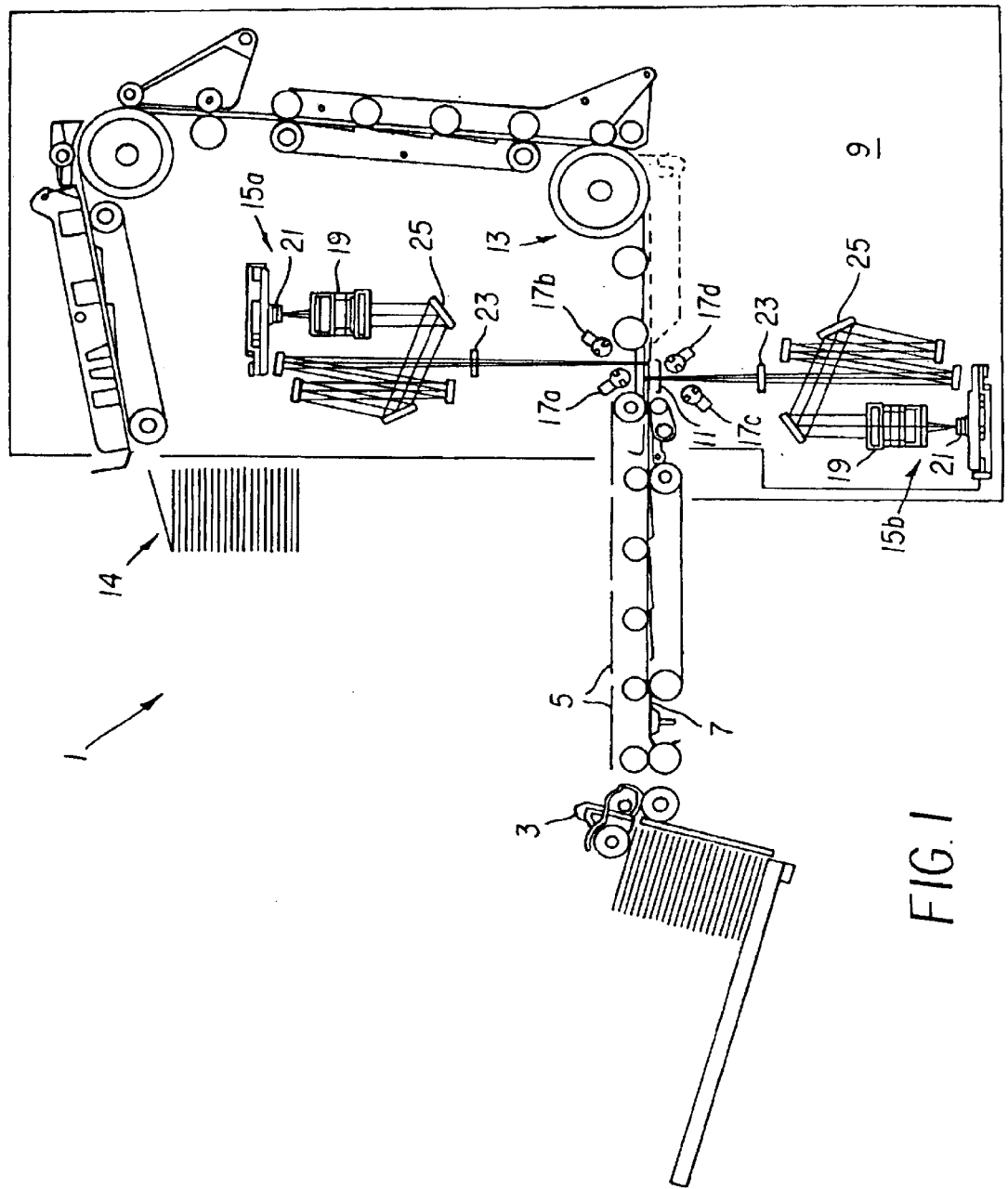
FIG. 1 is a side schematic view of the document scanner of the invention.

With reference to FIG. 1, wherein like numerals designate like components throughout all of the several Figures, the document scanner 1 of the invention includes a document feeder 3 for feeding input documents 5 to a feeder conveyor 7, where they are received by scanning station 9. The station 9 has a platen 11 formed from glass or transparent plastic plates for receiving the input documents 5 and for maintaining them in a flat orientation as they are moved across the line-of-sight of electronic imaging cameras. The scanning station 9 further includes an internal document transporter 13 formed from an array of belts and rollers for conveying documents out of the platen, where they are moved along a C-shaped path and placed upon a stack of output documents 14 as shown.

Upper and lower light sources 17a, b and 17c, d are provided for illuminating both the back and front sides of documents as they are transported through the platen 11. Electronic imaging cameras 15a, b are disposed above and below the platen for scanning the front and back of each of the documents 5 respectively. Each of the cameras 15a, b includes a focusing lens for converging an image of one side of the document into an image sensor array 21. A directing lens 23 and a mirror array 25 directs reflected light from the front and back of each of the documents in the platen 11 into the focusing lenses 19 of cameras 15a, b.

Figure 2A:
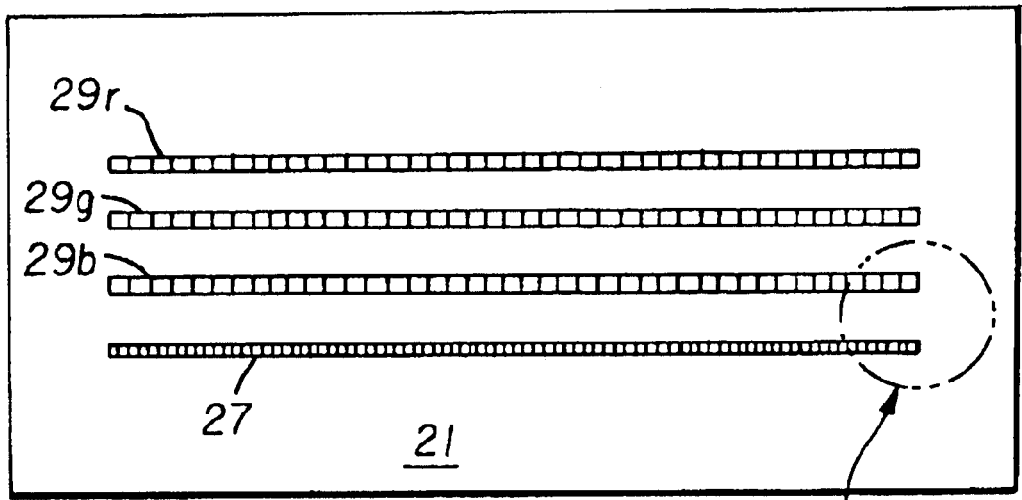
FIG. 2A is a plan view of the imaging sensor assembly of the camera used in the scanner of the invention.
Figure 2B:
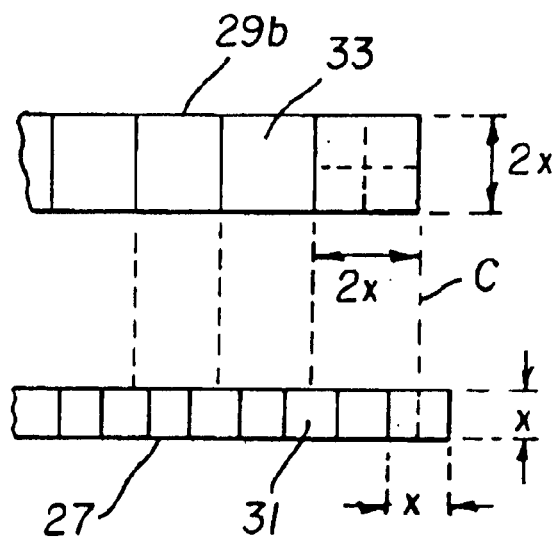
FIG. 2B is an enlargement of the area in FIG. 2A encompassed by the phantom circle, illustrating how the pixels of the grayscale imaging sensor are arranged relative to the pixels of the color imaging sensors.

With reference now to FIGS. 2A and 2B, the image sensor array 21 has a linear charge coupled device-type (CCD) grayscale sensor 27 and three linear CCD color sensors 29r, g, b for receiving red, green, and blue light, respectively. Although not shown in the Figures, each of the color sensors 29r, g, b is covered by a color filter which transmits only red, green, or blue light, respectively. FIG. 2B illustrates the fact that there are twice as many pixels in the grayscale sensor 27 as there are in any of the color sensors 29. Specifically, each of the pixels 31 of the grayscale sensor 27 has a length and width of "x," while the length and width of the pixels of each of the color sensors 29r, g, b is "2x." This relative sizing, in combination with the fact that the camera control circuit extracts data from the grayscale sensor 27 at twice the rate that it extracts data from any of the color sensors 29r, g, b results in each of the cameras 15a, b having a grayscale resolution that is four times that of the color resolution. In the preferred embodiment, the grayscale color sensor 27 has between 300 to 600 pixels per inch (relative to the document), while each of the color sensors 29r, g, b has between about 100 to 300 pixels per inch. All of the sensors 27, 29r, g, b are arranged mutually parallel to one another as shown in FIG. 2A. Additionally, the smaller pixels 31 of the grayscale sensor 27 are arranged "on center" with respect to the larger pixels 33 of the color sensors 29r, g, b, as is shown in FIG. 2B. Note in particular how centerline C of the first pixel of the grayscale sensor 27 is aligned with the edge of the first pixel of the color sensor 29b. Such alignment is believed to reduce the creation of aliasing artifacts. It is, of course, possible to align the edges of a pair of the smaller grayscale sensor pixels 31 with the larger color sensor pixels 33. Such alignment is known as "on edge." While such "on edge" alignment does not reduce the creation of the aliasing artifacts, it has the advantage of simplifying spatial image processing. While "on center" alignment is preferred, the invention encompasses all alignments, including "on edge."

Figure 3:
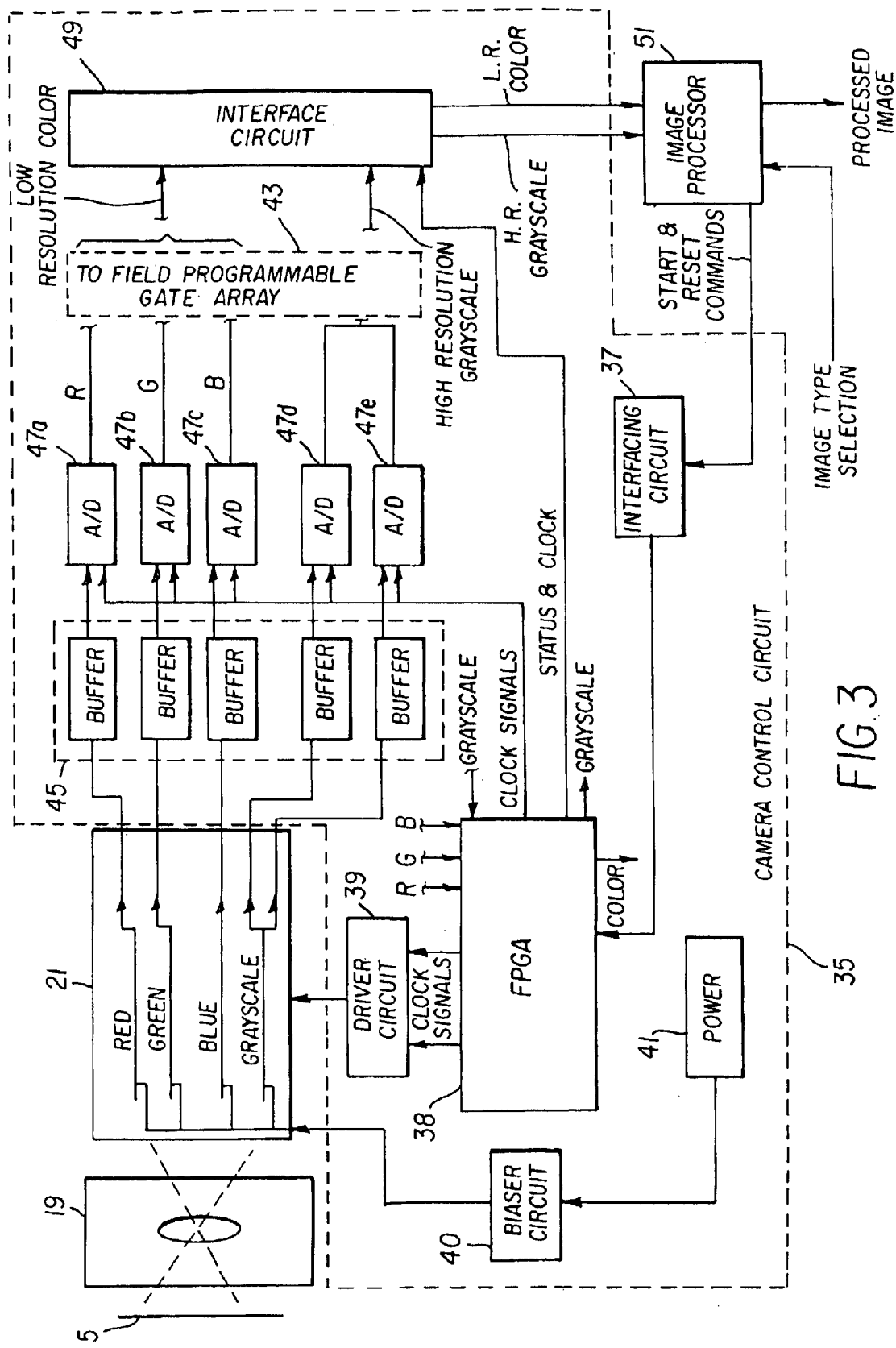
FIG. 3 is a schematic and functional diagram of the circuit of the camera used in the scanner of the invention.

With reference now to FIG. 3, the camera control circuit 35 includes an interfacing circuit 37 for receiving start and reset commands from the image processor 51, which is outside of the camera circuit 35. The interfacing circuit 37 converts the voltages of the signals received from the processor 51 to voltages which may be received and processed by a field programmable gate array (FPGA) 38. In the preferred embodiment, the interfacing circuit 37 is a Model No. D590LV032 interface manufactured by National Semiconductor, located in Santa Clara, Calif. The FPGA 38 is in turn connected to a driver circuit 39 which is in turn connected to each of the imaging sensors 27, 29r, g, b. Each of the imaging sensors 27, 29r, g, b is also connected to a biasing circuit 40 which is powered by a power source 41. The FPGA 38 provides clock signals to the driver circuit 39 which cooperates with the biasing circuit 40 to periodically convey to buffer amplifier 45 sampling of voltages from the sensors 27, 29r, g, b indicative of light intensities. While not specifically indicated in the drawing, the driver circuit 39 is independently connected to each of the imaging sensors 27, 29r, g, b and drives the linear CCD grayscale sensor 27 at twice the rate as any of the color sensors 29r, g, b. In the preferred embodiment, the driver circuit frequency for the grayscale sensor 27 is 12 megahertz, while the effective frequency for each of the color sensors 29r, g, b is 6 megahertz. The driver circuit 39 may be a Model No. 74ACTQ244 manufactured by National Semiconductor, while the field programmable gate array is preferably a Model No. EPF6016ATC144-2 manufactured by Altera Corporation, located in San Jose, Calif. The biasing voltages applied by the biasing circuit 39 may be anywhere between 3 and 5 volts. The buffer amplifier circuit 45 is preferably a single stage emitter-follower type amplifier and may be, for example, a Model No. MMB79401 type amplifier manufactured by Motorola, located in Schaumburg, Ill.

The buffer amplifier circuit 45 amplifies the analog currents it receives from the sensors 27, 29r, g, b and transmits the resulting signals to a series of analog to digital converters 47a–e. In the preferred embodiment, each of the analog to digital converters 47a–e may be a Model No. 98L55 integrated circuit manufactured by EXAR, located in Fremont, Calif. Advantageously, such a circuit provides correlated double sampling for the analog voltages periodically received for each pixel from the buffer amplifier circuit 45, which results in a more accurate digitization of these voltages.

The analog to digital circuits 47*a–e* transmit a digitized data signal corresponding to 8 bits for every pixel for every clock pulse. However, as there are twice as many pixels and twice as many clock pulses associated with the grayscale sensor 27, four times as many bits of information are transmitted from the analog to digital converters 47*d, e* as for each of the converters 47*a, b, c*. It should be noted that the analog to digital converters could have any desired resolution. Hence, while the resolution level is 8 bits per pixel in this particular example, it might be, for example, 12 bits per pixel. Additionally, the special resolution may vary between the channels, i.e., the grayscale channel may have more than twice as many pixel than any of the color channels. Finally, because the linear CCD sensors are not equally sensitive to all frequencies of light, the analog to digital circuits adjust the gain of the analog signals that the converters 47*a–e* receive during the digitization process in order to equalize the output for all of the channels.

The digitized output from each of the analog to digital circuits 47*a–e* is routed to the field programmable gate array 43 which in turn converts all three color channels into a single coordinated data stream by sorting out and combining the red, green, and blue color bits for each pixel, and by further processing the grayscale data bytes in a form that can be more easily combined with the color data stream.

Both the combined color data stream and the high-resolution grayscale data stream are inputted into an interfacing circuit 49. The interfacing circuit 49 is a serial to parallel converter that divides and "stacks" both data streams into a format more easily processed by the image processor 51. In the preferred embodiment, interfacing circuit 49 may be a Model No. D590CR215 serial to parallel converter manufactured by National Semiconductor. The serial to parallel conversion operation performed by the interfacing circuit 49 is coordinated with the operation of the buffer circuit 45 and analog to digital converters 47*a–e* by clock signals received from the field programmable gate assembly 43, which also provides such signals to the driver circuits 37.

Figure 4:
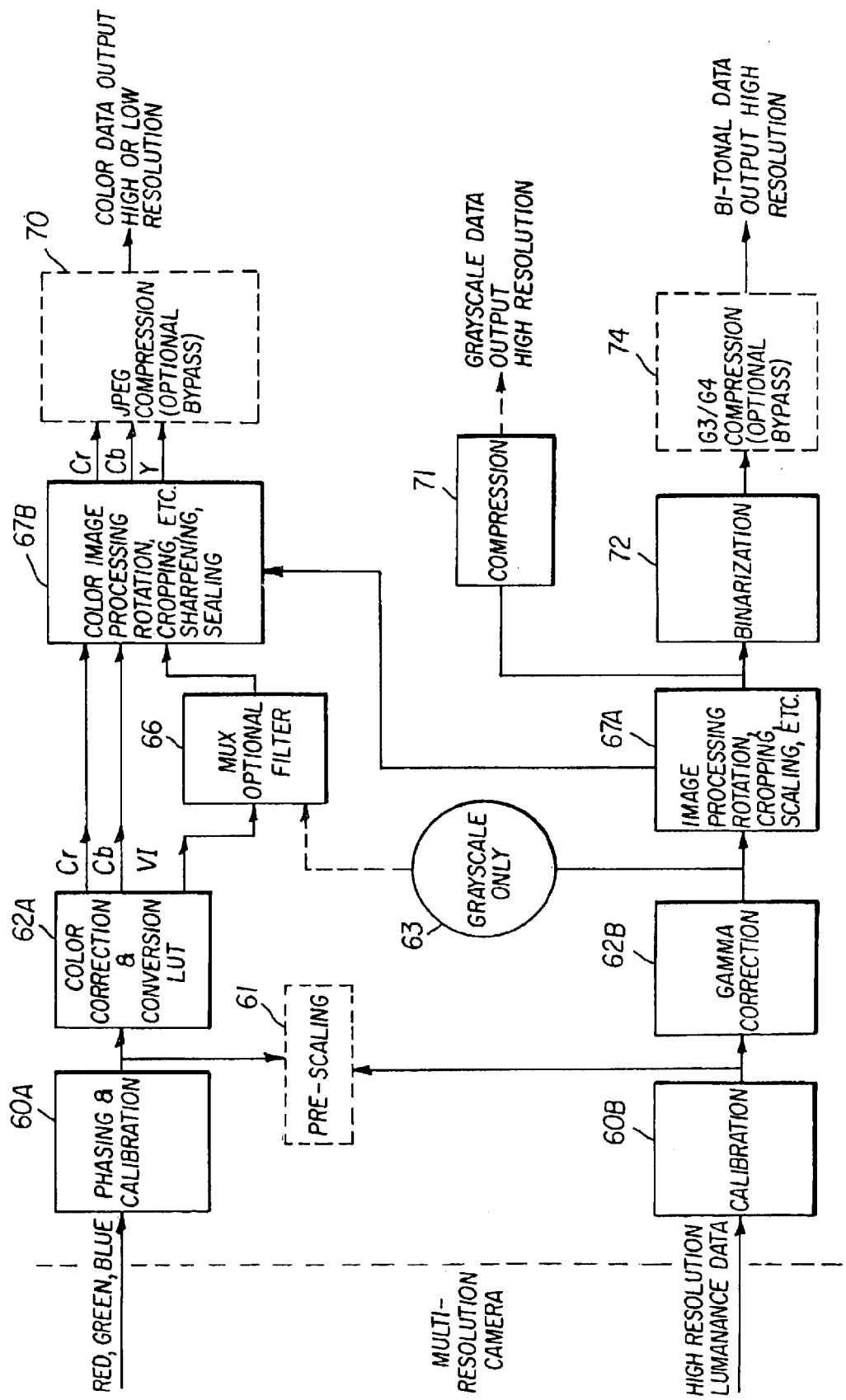
FIG. 4 is a schematic diagram of the image processing conducted by the scanner.

The color and grayscale data outputs of the interfacing circuit 49 are simultaneously transmitted to the imaging processor 51 as indicated, which further processes the data in accordance with the process steps indicated in FIG. 4 to form a complete electronic document image that allows the image to be reproduced in a printer or a video monitor.

FIG. 4 illustrates the image processing steps that the image processor 51 conducts on the two data streams provided to it by the camera circuit 35. With respect to the color data stream received from the interface circuit 49, the processor 51 proceeds with phasing and calibration steps 60A. In the phasing portion of this step, the red, green, and blue channels are matched up in the time domain by accounting for the distance between the parallel-spaced color sensors 29*r, g, b*, and the differences in time that these sensors "see" the same portion of the document being scanned. In the calibration portion of this step, the data from each of the color sensors 29*r, g, b* is normalized by applying a unique gain and offset for each pixel. Additionally, anomalous readings with respect to any particular pixel may be disregarded by either substitution or interpolation. Simultaneously, a calibration step is also conducted with respect to the grayscale data stream as indicated in step 60B.

In the next step of the process, the processor 51 considers whether or not low-resolution or high-resolution images have been selected in combination with color, grayscale, or bi-tonal. If only low-resolution image combinations have been selected, a command is sent to the document feeder 3 to increase the feeding speed by 50%, but to effectively cancel the signal from every third pixel received from the sensors 27, 29*r, b, g*. This could be done by, for example, maintaining the signal from one of a group of three pixels while averaging the signal from the other two. Hence, if the color data at normal resolution is 150×150 pixels, and the grayscale data at normal resolution is 300×300 pixels then the imaging sensor processes the color data at 100×100 pixels and the grayscale data at 200×200 pixels (per inch at the document). However, if high-resolution images are chosen, the pre-scaling step 61 is bypassed.

In the next step of the process, the imaging processor provides color correction to the color data stream in step 62A, and gamma correction to the grayscale stream in step 62B. The purpose of such corrections is to balance the colors produced and the contrasts perceived in the final image with the physiological response of the human eye, as is indicated in step 62A and B. Additionally, in step 62A, the red, green, and blue data is converted into a different color coordinate system, i.e., CrCbY as indicated, for two reasons. First, such coordinate conversion allows the color data to be integrated with the grayscale data easier and with less processing bandwidth. Secondly, if JPEG compression is desired, the JPEG processing steps are more easily carried out with the Cr-Cb-Y color coordinate system. The coordinate conversion is performed via a look-up table (LUT) in order to reduce processing time and to conserve bandwidth.

In the next step of the process, the image processor 51 considers whether or not color images are desired, or grayscale/bi-tonal images only are requested, as is indicated in step 63. If grayscale/bi-tonal images only are requested, then the imaging processor will not perform the remaining processing steps 66, 67B, or 70. However, if high-resolution color images are selected, then the image processor 51 proceeds to step 66, and proceeds to integrate the Y data from the grayscale data stream into the color stream via a multiplexing process.

The image processor 51 then proceeds to step 67A with respect to the grayscale data stream and proceeds to perform image rotation, cropping, and scaling, i.e., processing the image data so the proper orientation and borders of the final image are provided. This step is performed simultaneously with the color data stream as well, as is indicated in block 67B. When high or low-resolution color images are desired, the image processor may proceed to block 70, and compress the color images via standard JPEG processing steps. Whether compression is selected or not, the processing of color images is completed at this step. Similarly, when only grayscale images are selected (either high or low resolution), the processing of such grayscale images is completed at step 67A. The resulting processed grayscale image may be compressed or not, as is indicated by phantom step 74.

If bi-tonal images are desired, the grayscale image produced via process step 67A is subjected to a binarization step 72. The resulting bi-tonal image may be compressed or not, as is indicated by phantom step 74.

While this invention has been described with respect to a preferred embodiment of a system and process, various modifications and additions will become evident to persons of ordinary skill in the art. All such additions, modifications, and variations are intended to be encompassed within the scope of this patent, which is limited only by the claims appended hereto.

Parts List

1. Document scanner
3. Document feeder
5. Input documents
7. Feeder conveyor
9. Scanning station
11. Platen
13. Document transporter
14. Output documents
15. Cameras a, b
17. Light sources a, b, c, d
19. Focusing lens
21. Image sensor array
23. Directing lens
25. Mirror array
25. [Sensor array]
27. Linear CCD grayscale sensor
29. Linear CCD color sensors r, g, b
31. Pixel (grayscale sensor)
33. Pixel (color sensor)
35. Camera control circuit
36. Image selector and command circuit
37. Interfacing circuit
38. Filed programmable gate array
39. Driver circuit
40. Biaser circuit
41. Power
43. Field programmable gate array
45. Buffer amplifier
47. Analog to digital converters a-3
49. Interface circuit
51. Imaging processor
60. Phasing and calibration steps A, B
61. Pre-scaling
62. Color connection and LUT conversion and gamma correction A, B
63. Grayscale only selection step
64. Scale
66. Multiplexer
67. Rotation and cropping A, B
70. JPEG compression
71. Compression
72. Binarization step
74. Compression

What is claimed is:

1. A document scanner for producing document images having a selectable range of resolutions with a minimum amount of bandwidth comprising:
    an imaging camera including a plurality of electronic imaging elements, one of which generates grayscale image data, the balance of said elements generating color image data, wherein said grayscale image element generates more image data than any one of said color image elements to provide a perceptively higher resolution image than said color image elements, and
    an image processing circuit for processing data generated by said imaging elements into higher resolution and lower resolution color document images, higher resolution and lower resolution grayscale document images, and higher resolution and lower resolution bi-tonal document images,
    wherein the image processing circuit generates the higher resolution color document image by integrating higher resolution grayscale image data with lower resolution color document image data.

2. The document scanner for producing document images according the claim 1, wherein the image processing circuit also performs image rotation, cropping, scaling and compression of the higher resolution and lower resolution color document images, higher resolution and lower resolution grayscale document images, and higher resolution and lower resolution bi-tonal document images.

3. The document scanner for producing document images according the claim 2, wherein said image processing circuit processes bi-tonal document images with less bandwidth than grayscale document images, and processes grayscale document images with less bandwidth than color document images, and low resolution document images with less bandwidth than high resolution document images.

4. The document scanner for producing document images according the claim 1, wherein said grayscale image element generates at least twice as much image data as said color image elements.

5. The document scanner for producing document images according the claim 4, wherein said grayscale image element generates at least four times as much image data as said color image elements.

6. The document scanner for producing document images according the claim 1, wherein said electronic imaging elements are linear image sensors.

7. The document scanner for producing document images according the claim 6, wherein the grayscale image sensor has between about 300 to 600 pixels per inch while each of the color image sensors has between about 100 to 300 pixels per inch at a document plane.

8. The document scanner for producing document images according the claim 7, wherein said linear image sensors are arranged mutually parallel, and wherein center portions of said pixels of said grayscale sensor are aligned with side edges of said pixels of said color sensors.

9. The document scanner for producing document images according the claim 1, further comprising a driver circuit connected to said electronic imaging elements for conveying image data from said electronic imaging elements to buffer circuits.

10. The document scanner for producing document images according the claim 9, wherein said driver circuit conveys image data from said grayscale imaging element at a rate that is at least twice as fast as from said color imaging elements.

11. A document scanner for producing document images having a selectable range of resolutions and processing bandwidth, comprising:
    an imaging camera including a grayscale electronic imaging element and a plurality of color electronic imaging elements wherein said grayscale image element generates more image data than any one of said color image elements to provide a perceptively higher resolution image than said color image elements, and
    an image processing circuit for processing data generated by said imaging elements into a selected one of higher and lower resolution document images in combination with a selected one of color, grayscale, or bi-tonal image types with respectively lower processing bandwidths,
    wherein the image processing circuit generates a higher resolution color document image by integrating higher resolution grayscale image data with lower resolution color document image data.

12. The document scanner for producing document images according the claim 11, wherein said grayscale image element generates at least twice as much image data as said color image elements.

13. The document scanner for producing document images according the claim 12, wherein said grayscale image element generates at least four times as much image data as said color image elements.

14. The document scanner for producing document images according the claim 11, wherein said electronic imaging elements are linear CCD image sensors.

15. The document scanner for producing document images according the claim 14, wherein the grayscale image sensor has between about 300 to 600 pixels per inch at the document while each of the color image sensors has between about 100 to 300 pixels per inch at the document.

16. The document scanner for producing document images according the claim 15, wherein said linear image sensors are arranged mutually parallel, and wherein center portions of said pixels of said grayscale sensor are aligned with side edges of said pixels of said color sensors.

17. The document scanner for producing document images according the claim 14, wherein said imaging camera includes three color image sensors for sensing red, green, and blue, respectively.

18. The document scanner for producing document images according the claim 11, further comprising a document feeder mechanism for feeding documents through a line-of-sight of said imaging camera.

19. The document scanner for producing document images according the claim 11, wherein the image processing circuit also performs image rotation, cropping, scaling and compression of the higher and lower resolution document images.

* * * * *